United States Patent Office 2,928,090
Patented Mar. 8, 1960

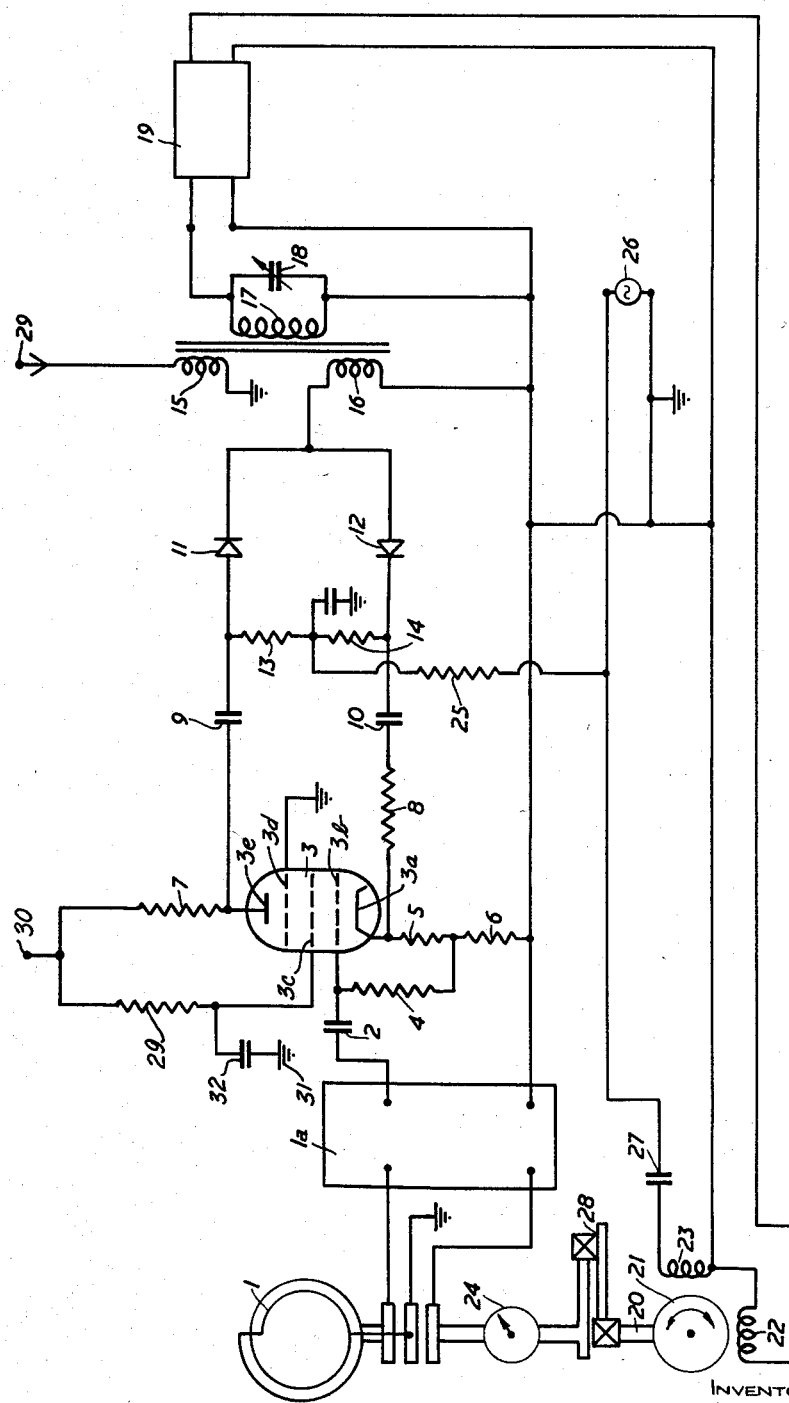

2,928,090

RADIO DIRECTION FINDERS

Roy Watson Sharples, Chelmsford, England, assignor to Marconi's Wireless Telegraph Company Limited, London, England, a British company Application October 24, 1955, Serial No. 542,459

7 Claims. (Cl. 343—117)

This invention relates to direction finding receivers and in particular it relates to that type of so-called "switched cardiod" direction finding receiver in which radio frequency signals from a directional aerial are combined with signals from an omni-directional aerial, for the purpose of providing an automatic indication of both direction and sense. In this type of direction finding equipment a switching arrangement, comprising a balanced modulator circuit, is often provided in the channel from the directional aerial to that part of the equipment where the directionally sensitive signals and the omni-directional signals are combined, this switching arrangement being of the type in which two electronic devices are switched by an alternating voltage so as to control the conductivities of said two devices in such a manner that on positive half-waves of switching voltage one device is conductive and on the negative half-waves of switching voltage the other device is conductive. When the received directional signal passes through a null point the signals in the directional channel as applied to the combining circuit will change in phase by 180°. Thus when the signals from the directional aerial are combined in the combining circuit with the signals from the omni-directional aerial an indication of both direction and sense is automatically provided.

According to this invention there is provided a radio-direction finder receiver of the kind in which direction sensitive received signals are combined with omni-directionally received signals in a combining circuit, for the purpose of providing an automatic indication of both direction and sense, wherein said received direction sensitive signals are arranged to be fed to said combining circuit through a channel including a phase splitter, whose input is fed with the received direction sensitive signals, the phase splitter having two outputs at which the signals appear in phase opposition, a pair of oppositely poled rectifiers, one rectifier having one pole fed from one of the outputs and the other rectifier having an opposite pole fed from the second of the outputs, the remaining poles of the rectifiers being arranged to feed into a common point, a source of relatively low frequency modulating potentials, means for applying the modulating potentials from the source, in phase to the first mentioned poles of each one of said rectifiers, and means for feeding balanced modulating waves appearing at said common point to said combining circuit.

For a better understanding of the invention and to show how the same may be carried into effect reference will now be made to the accompanying drawing.

Referring to the drawing, at 1 is shown a rotatable loop aerial feeding an amplifier 1a for providing, at the input of the balanced modulator valve 3, a radio frequency signal amplitude dependent upon the direction of the received signal. The valve 3 is a pentode including cathode 3a, control grid 3b, screen grid 3c, shield grid 3d and anode 3e. The output of amplifier 1a connects to the control grid 3b and the cathode 3a. A stabilizing circuit is provided extending from screen grid 3c through resistance 29 to the anode source connection 30 and returning through anode load resistance 7 to anode 3e. This stabilizing circuit is connected to ground 31 through condenser 32. The valve 3 is connected in a normal phase splitter circuit in which the load impedance is divided between the anode circuit and the cathode circuit. In the drawing, the anode load is indicated at 7 and the cathode load is shown at 5 and 6. The resistance shown at 5 functions also as a normally provided grid bias resistance, to which the grid leak 4 is conencted. The radio frequency voltage output is taken from valve 3 at the anode and cathode terminals respectively and the radio frequency voltages from these two points are applied to two oppositely poled rectifiers 11 and 12. Condensers 9 and 10 are normal blocking condensers. Anode 3e connects to one side of condenser 9 and cathode 3a connects to one side of condenser 10 through resistance 8. The other side of condenser 9 connects to rectifier 11. The other side of condenser 10 connects to rectifier 12. The opposite sides of the two rectifiers 11 and 12 are joined together and to the coil 16 in the combining circuit. An omni-directional aerial is connected to coil 15 in the combining circuit. On the side of the rectifiers 11 and 12 joined to the valve 3 are two feed resistances 13 and 14 to the center point of which is connected a resistance 25 and thence to a source of low frequency voltage at 26, the amplitude of which is high compared to that of the received signal. Coupled to the coils 15 and 16 is a tuned circuit consisting of coil 17 and condenser 18 from which signals are applied to the radio frequency stage of a normal direction finding receiver 19. A two phase motor 21 is mechanically coupled by shaft 20 and gear train 28 to the loop aerial 1, one winding of said motor being connected to the output terminals of the direction finding receiver and the other winding being connected through a phase changing impedance, shown as a condenser 27 to the source of low frequency modulating voltage. A direction indicator is shown at 24.

The operation of the embodiment shown in the drawing is as follows. Radio frequency signals from the loop 1 provide a voltage at the input electrode of valve 3, the amplitude of these signals varying in well known manner with the direction of the received signals. The signal appearing at the cathode and anode terminals of valve 3 will, therefore, be in opposite phase with respect to each other and these oppositely phased signals are applied through the condensers 9 and 10 to the rectifiers 11 and 12. The low frequency voltage provided by the low frequency source acts as the switching or modulating voltage and is applied through resistance 25 to the mid-point of the resistances 13 and 14 so that at the input electrodes of rectifiers 11 and 12 this voltage is in phase. Thus as the sign of said low frequency voltage varies it will render the rectifiers conductive alternately and thereby cause alternate rectifiers to provide a directionally sensitive signal in the coil 16 of the combining circuit. The signal derived from the omni-directional aerial and coil 15 is combined in tuned circuit 17 and 18, with the switched directionally sensitive signals in coil 16 and the output from the tuned circuit 17, 18 is taken to the commonly provided directional receiver 19.

After amplification and detection in said directional receiver 19 the signal is fed to one winding 22 of the two phase motor 21, the other winding 23 of this motor being fed from the low frequency voltage source 26 through the phase changing condenser 27. With this arrangement when the loop is in the null position there is, of course, no current output from the receiver in block 19 but when the loop is turned away from this null position as output is provided at the low switching frequency and this will be applied to the two phase motor to thereby cause this to rotate and thereby turn the loop aerial back to the null position. The phase of the detected signal output from the receiver depends upon the sense in which the loop is turned with respect to the null position and thereby ensures that the two phase motor 21 always returns the loop to the null position.

In the operation of this circuit it is preferred to have the valve 3 balanced for providing equal radio frequency outputs to the rectifiers 11 and 12. Such balance need not be very exact but in order to ensure a reasonably good approach to balance there is provided an additional resistance 8 in the lead from the cathode terminal of valve 3 to the rectfier 12. In this way it is quite a simple matter to make the cathode impedance equal to that of the anode. In practice it has been found satisfactory to use as the switching voltage applied to terminals 26 an alternating voltage of 20 volts as a frequency of 70 c.p.s.

I claim:

1. A radio direction finder receiver of the kind in which directional sensitive received signals are combined with omni-directional received signals in a combining circuit for the purpose of providing an automatic indication of both direction and sense, and comprising in combination, a uni-directional aerial, an omni-directional aerial, a combining circuit for combining signals incident upon said aerials, a channel including a phase splitter, means for feeding direction sensitive signals from said uni-directional aerial to said combining circuit through said channel, separate means for feeding signals from said omni-directional aerial to said combining circuit, output means for taking from said phase splitter two signals in phase opposition, a pair of oppositely poled rectifiers, means for feeding one of the signals taken from the phase splitter to one pole of one said rectifier, means for feeding the opposite pole of the other said rectifier with the other of the signals taken from the phase splitter, means for feeding the remaining poles of said rectifiers into a common point, a source of relatively low frequency modulating potentials, means adapted for applying the modulating potentials from the source in phase to the first mentioned poles of each one of said rectifiers, and means for feeding the balanced modulating waves appearing at said common point to said combining circuit.

2. A radio direction finder receiver as set forth in claim 1 wherein the phase splitter comprises a valve, means for supplying the received direction sensitive signals to the control grid of the valve, means for adapting the anode and cathode of said valve to serve as the two outputs of the phase splitter, substantially equal anode and cathode load impedances, means adapted to insure that the direction sensitive signals are of substantially the same amplitude at each of said rectifiers and in phase opposition.

3. A radio direction finder receiver as set forth in claim 1 comprising resistance means extending between the poles of said rectifiers, said resistance means forming part of the means for applying the low frequency modulating potentials in phase to the poles of the rectifiers, a connection between the source of frequency potentials to the effective electrical midpoint of the resistance means, whereby the low frequency modulating potentials applied to the poles of the rectifier are in phase with each other.

4. A radio direction finder receiver as set forth in claim 1 comprising a rotatable loop aerial or the like for receiving direction sensitive signals, an electric motor having two phase windings and adapted to rotate said loop, means for detecting the combined signal output from the combining circuit, said first phase windings for said motor being adapted to receive output from the combining circuit, an impedance connected between the combining circuit and the second said winding whereby the phase of the low frequency modulating potentials from the source thereof is changed, the second said winding being adapted to receive the phase changed modulating potentials.

5. A radio direction finder receiver of the kind in which directional sensitive received signals are combined with omni-directional received signals in a combining circuit for the purpose of providing an automatic indication of both direction and sense, as set forth in claim 1 in which said phase splitter is a pentode having a cathode, a control grid, a screen grid, a shield grid and an anode, and wherein direction sensitive signals are applied between the cathode and control grid of said phase splitter and the output means are connected between the cathode and anode of said phase splitter, and wherein a stabilizing circuit containing series connected resistors is connected between said screen grid and said anode, said stabilizing circuit being connected through a condenser to ground adjacent the screen grid end of said circuit and a source of anode potential connected intermediate said series connected resistors for feeding anode potential to said anode through one of the resistors in said stabilizing circuit.

6. A radio direction finder receiver of the kind in which directional sensitive received signals are combined with omni-directional received signals in a combining circuit for the purpose of providing an automatic indication of both direction and sense, as set forth in claim 1 in which said phase splitter is a pentode having a cathode, a control grid, a screen grid, a shield grid and an anode, and wherein direction sensitive signals are applied between the cathode and control grid of said phase splitter and the output means are connected between the cathode and anode of said phase splitter, said output means being bridged by a pair of series connected feed resistances having a center connection therebetween and a resistance interconnecting the said center connection with one side of said combining circuit.

7. A radio direction finder receiver of the kind in which directional sensitive received signals are combined with omni-directional received signals in a combining circuit for the purpose of providing an automatic indication of both direction and sense, as set forth in claim 1 in which said phase splitter is a pentode having a cathode, a control grid, a screen grid, a shield grid and an anode, and wherein direction sensitive signals are applied between the cathode and control grid of said phase splitter and the output means are connected between the cathode and anode of said phase splitter, and including a source of anode potential, anode load resistors interconnecting said source with said anode, cathode load resistors interposed in a series path to the cathode of said pentode and a balancing resistance interposed between said cathode and said output means.

References Cited in the file of this patent

UNITED STATES PATENTS

| 2,314,029 | Bond | Mar. 16, 1943 |
| 2,356,922 | Eltgroth | Aug. 29, 1944 |
| 2,420,395 | Greene | May 13, 1947 |
| 2,840,814 | Hemphill et al. | June 24, 1958 |